United States Patent
Carlson et al.

[11] Patent Number: 5,544,304
[45] Date of Patent: Aug. 6, 1996

[54] FAULT TOLERANT COMMAND PROCESSING

[75] Inventors: Wayne C. Carlson; Michael J. Meadows; Merrill B. Greco, all of Tucson, Ariz.

[73] Assignee: International Business Machines Corporation, Armonk, N.Y.

[21] Appl. No.: 217,829

[22] Filed: Mar. 25, 1994

[51] Int. Cl.⁶ ................................................. G06F 11/34
[52] U.S. Cl. .................... 395/182.08; 395/182.09
[58] Field of Search ..................... 95/575, 425, 725, 95/275, 182.08, 182.09, 182.05

[56] References Cited

U.S. PATENT DOCUMENTS

| | | | |
|---|---|---|---|
| 4,358,823 | 11/1982 | McDonald et al. | 364/200 |
| 4,449,182 | 5/1984 | Rubinson et al. | 364/200 |
| 4,777,595 | 10/1988 | Strecker et al. | 364/200 |
| 5,214,768 | 5/1993 | Martin et al. | 395/425 |
| 5,329,625 | 7/1994 | Kannan et al. | 395/275 |

FOREIGN PATENT DOCUMENTS

| | | | |
|---|---|---|---|
| 0478287 | 4/1992 | Germany | G06F 11/16 |
| 0475624 | 3/1992 | United Kingdom | G06K 17/00 |

Primary Examiner—Robert W. Beausoliel, Jr.
Assistant Examiner—Phung M. Chung
Attorney, Agent, or Firm—D. A. Shifrin

[57] ABSTRACT

The present invention provides a method and apparatus for reducing the overhead required in conventional fault tolerant processing by redundant processors. Commands are received and queued by both the active and standby units but are processed only by the active unit. Short messages, each including a command identifier, are transmitted from the active unit to the standby unit. In addition, periodic handshaking signals are exchanged between the two units. In the event the active unit fails, the standby unit is automatically brought on-line to process the unprocessed commands and transmit responses to the command source. When the failed unit is restored, it can become the standby unit.

20 Claims, 3 Drawing Sheets

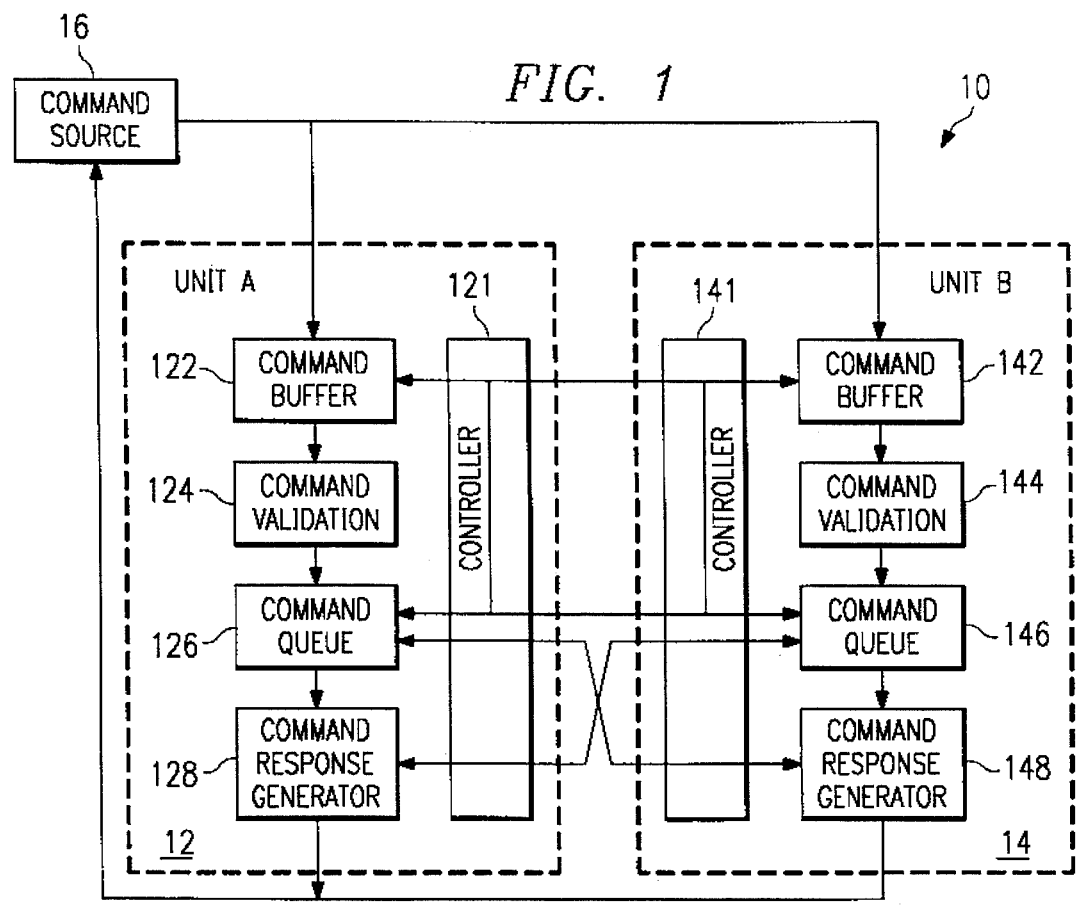
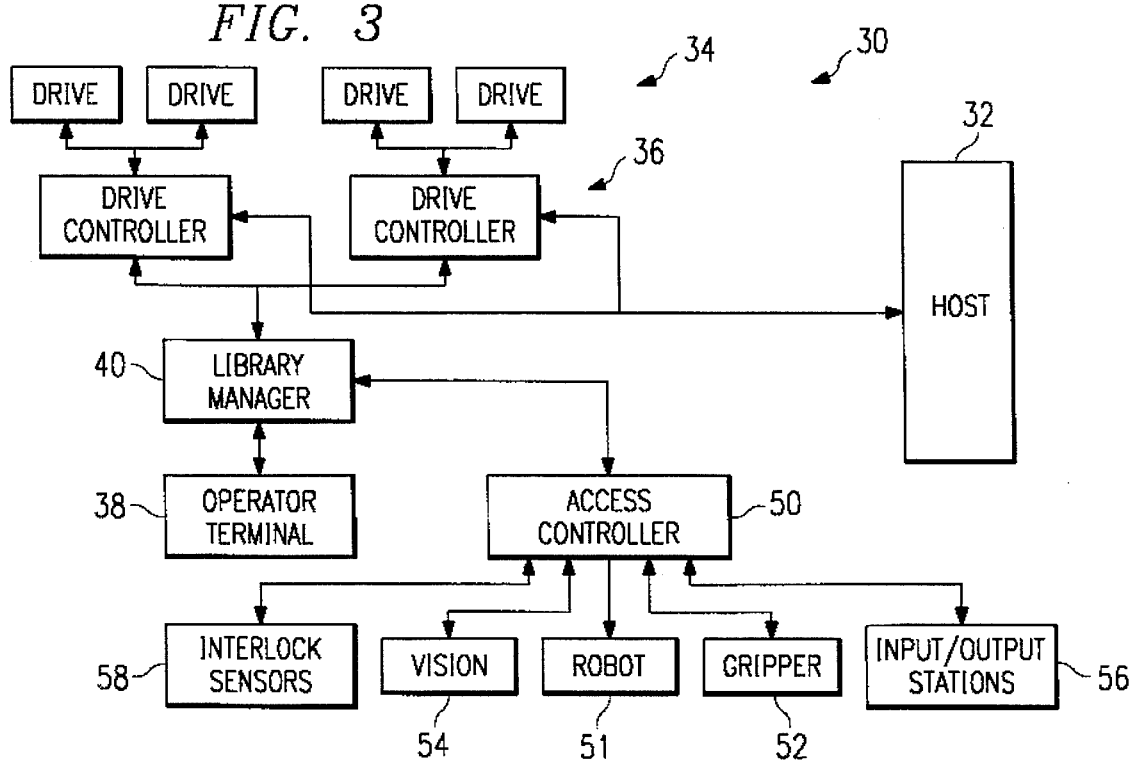

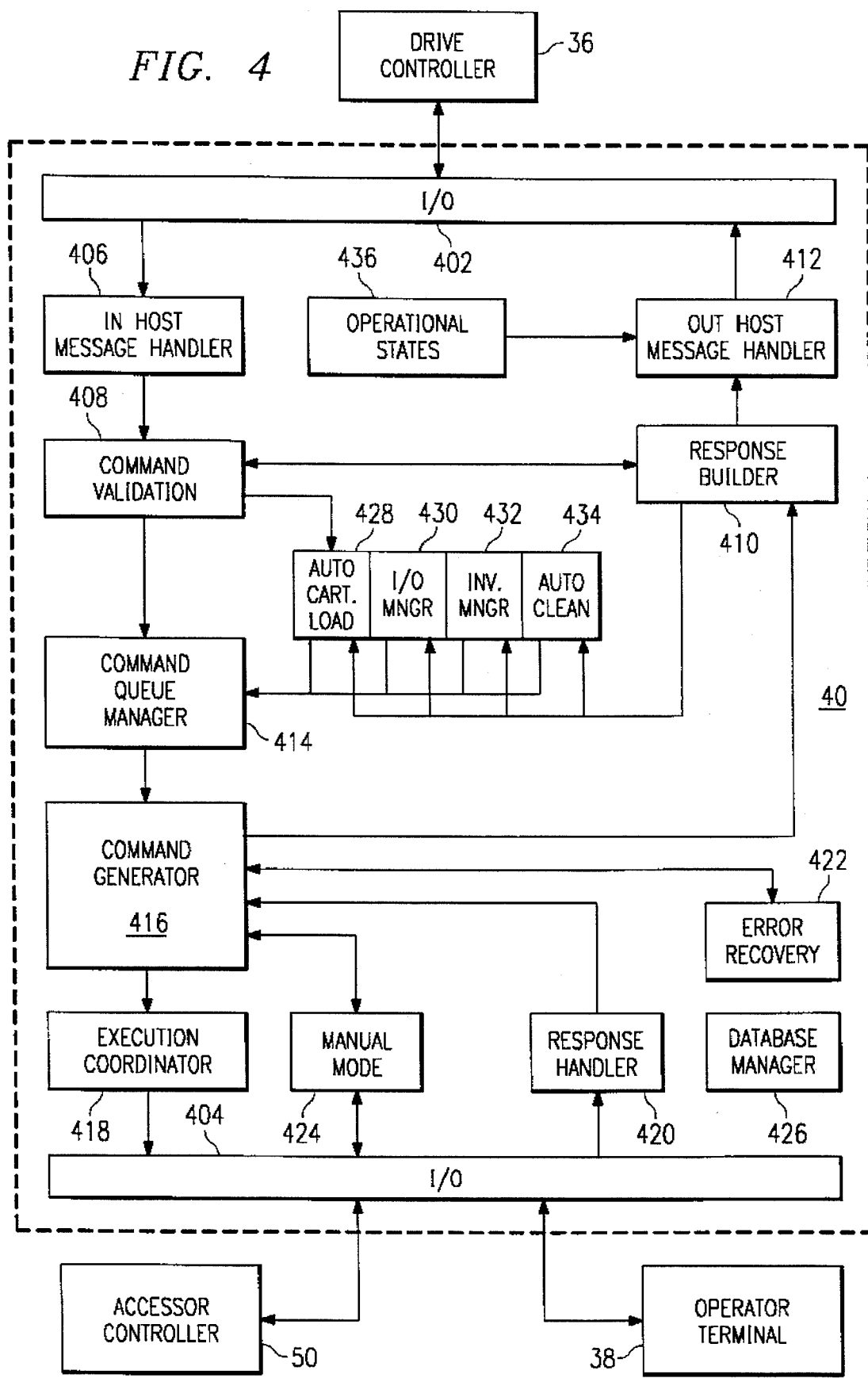

FAULT TOLERANT COMMAND PROCESSING

TECHNICAL FIELD OF THE INVENTION

The present invention relates to fault tolerant systems having redundant components, and in particular, to a method and apparatus for reducing the overhead required in conventional fault tolerant processing by redundant processors.

BACKGROUND OF THE INVENTION

Fault tolerant computer systems have been used for some time in large computer installations to ensure that data processing continues even when otherwise "fatal" errors occur. Such systems can include redundant processors and other components which operate simultaneously and in parallel such that, if one unit fails, the other immediately takes over. It will be apparent that all commands and data which are transmitted to one unit must also be transmitted to the other. Moreover, all responses generated by one unit should correspond with the responses generated by the other unit. When responses differ, an error or fault is indicated and a diagnostic procedure must be run to determine the location of the fault and the appropriate corrective action to be taken, including taking the faulty unit off-line and bringing the other unit on-line. Extensive inter-unit communications has typically been required for redundant systems to ensure that all commands are received and processed in parallel. Such communications impose significant overhead burdens on the units and the efficiency of the total system which increases the cost of the system. Consequently, fault tolerant, redundant systems have been more commonly used for high end, critical applications.

However, with the reduction in the prices of powerful computer technology, fault tolerant systems have become more affordable. For example, in an automated data storage and retrieval library system, such as the 3495 Tape Library Dataserver developed by International Business Machines Corporation, the library manager, which coordinates the functions of all of the individual components in the library, is a conventional personal computer. As such, its cost is a relatively small portion of the total cost of the library and a fault tolerant, redundant library manager has become an economically viable option desired by many customers. However, until now, the requirement for extensive inter-unit communications has not diminished.

SUMMARY OF THE INVENTION

In view of the foregoing, it is an object of the present invention to provide a fault tolerant, redundant processing system with more efficient inter-unit communications than previous systems.

It is another object to provide such a system in which the processing load on the backup unit is reduced.

It is still a further object of the present invention to provide a fault tolerant library manager in an automated data storage and retrieval system.

These and other objects are achieved in this invention by providing a fault tolerant system using redundant command processors to ensure that, despite a failure in one of the processors, commands received but not validated are validated, commands queued for execution are not lost, commands in the process of being executed are completed and responses not yet sent are sent. Moreover, synchronization between the redundant units is maintained with reduced inter-unit communications.

More specifically, commands are received and queued by both the active and standby units but are processed only by the active unit. In the event the active unit fails, the standby unit is automatically brought on-line to process the unprocessed commands and transmit responses to the command source. When the failed unit is restored, it becomes the standby unit.

In one embodiment, a system for fault tolerant command processing is provided, comprising: first and second receivers for receiving commands from a command source; first and second transmitters, interconnected with the first and second receivers, respectively, for transmitting a response to the command source; a first inter-unit interface interconnected with the first receiver and the first transmitter; and a second inter-unit interface interconnected with the second receiver, the second transmitter and the first inter-unit interface. The first receiver, the first transmitter and the first inter-unit interface comprise a first command processing unit and the second receiver, the second transmitter and the second inter-unit interface comprise a second command processing unit. The system further comprises a designation module for designating that the first command processing unit be an active unit and that the second command processing unit be a standby unit, whereby the first receiver and the first transmitter are operationally linked with the second receiver. The designation module can further comprise means for detecting when the first command processing unit is restored and means for redesignating the first command processing unit as the standby unit, whereby the second receiver and the second transmitter are operationally linked with the first receiver.

The foregoing and other features and advantages of the invention will be apparent from the following more particular description of preferred embodiments of the invention, as illustrated in the accompanying drawings.

BRIEF DESCRIPTION OF THE DRAWINGS

FIG. 1 is a block diagram of certain elements of redundant units of a fault tolerant system of the present invention and the inter-unit operational links therebetween;

FIG. 3 is a block diagram of an automated data storage and retrieval library system in which the fault tolerant system of the present invention can be incorporated; and FIG. 4 is a functional block diagram of a library manager employed in the present invention.

DETAILED DESCRIPTION OF THE INVENTION

Figure 2:
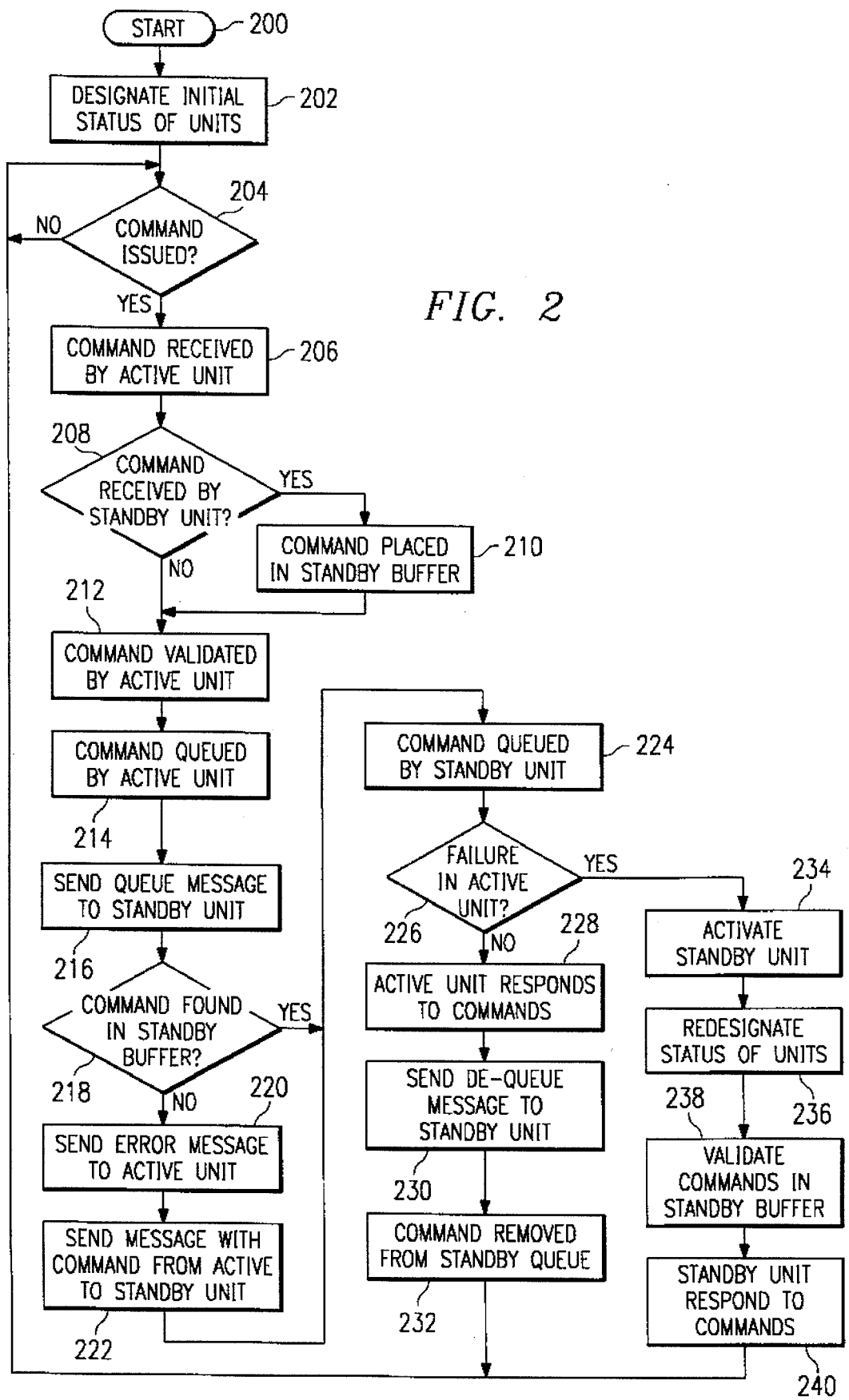
FIG. 2 is a flowchart of one embodiment of the method of the present invention.

FIG. 1 is a block diagram of a fault tolerant system 10 of the present invention employing redundant command processors A and B, 12 and 14, respectively, interconnected to a command source 16. The command processors 12 and 14 can be redundant library managers and the command source 16 can be drive controllers in an automated data storage and retrieval library system (as described below in conjunction with FIG. 3). However, the present invention is not limited to that particular configuration and is equally applicable in other operating environments. Each command processor unit 12 and 14 includes a unit controller 121 and 141, a command buffer 122 and 142, a command validation module 124 and 144, a command queue 126 and 146, and a command response generator 128 and 148. Each unit 12 and 14 can also include other modules (such as those discussed with reference to FIG. 4) which have been omitted from the FIG. for purposes of clarity.

Each unit 12 and 14 is interconnected to receive commands from, and send command responses to, the command source 16. Additionally, inter-unit communications are provided by links between: the command queues 126 and 146 of the two units 12 and 14; the command queue 126 or 146 of one unit 12 or 14 with the command buffer 142 or 122 of the other unit 14 or 12; and the command queue 126 or 146 of one unit 12 or 14 with the command response generator 148 or 128 of the other unit 14 or 12. These links are actually processed through the unit controllers 121 and 141 which direct the inter-unit communications.

Each command transmitted from the command source 16 has an associated identifier; in one embodiment, the identifier is four bytes long. Short messages are transmitted between the two units 12 and 14 inquiring about, or providing, the status of particular commands. Moreover, periodic handshaking occurs between the two units 12 and 14: one unit controller 121 or 141 sends a short signal to the other unit controller 141 or 121 which returns an acknowledgement. The failure of one of the unit controllers 121 or 141 to receive the appropriate signal provides an indication that the other unit 14 or 12 has suffered a problem. Consequently, both the number and size of inter-unit communications has been significantly reduced.

The operation of the fault tolerant system 10 will now be described with reference to the flowchart of FIG. 2. After start-up (Step 200), one of the two command processor units 12 or 14 is designated as the active unit and the other designated as the standby unit (Step 202). For purposes of this description, the unit A 12 has been designated initially as the active unit and the unit B 14 has been designated as the standby unit. In this configuration, the command queue 126 of the active unit 12 is functionally linked to the command buffer 142 and command queue 146 of the standby unit 14 and the command response generator 128 of the active unit 12 is linked to the command queue 146 of the standby unit 14. As previously described, such links are managed by the unit controllers 121 and 141. The command buffers 122 and 142 of both units 12 and 14 are coupled to the command source 16 and the command response generator 128 of the active unit 12 is coupled to the command source 16.

Both command buffers 122 and 142 wait for a command to be sent (Step 204) by the command source 16. A command is received by the active unit A 12 (Step 206) and placed in the command buffer 122. If the command has also been received by the standby unit B 14 (Step 208), the command is placed in the standby command buffer 142 (Step 210). After the command is placed in the active command buffer 122 (Step 206), the command is validated by the active command validator 124 (Step 212) and then moved to the active command queue 126 (Step 214). A message is sent by the active unit controller 121 to the standby unit controller 141 directing that the command be moved from the standby buffer 142 into the standby command queue 146 (Step 216); no validation is performed by the standby unit 14. If validation by the active unit A 12 is unsuccessful in Step 212, an error recovery procedure is invoked (generally including a request that the command source 16 resend the command); if validation is successful, it is not necessary for the standby unit 14 to repeat the validation.

A check is then made (Step 218) to determine whether the command was successfully found in the standby buffer 142. If not, an error message is transmitted to the active unit controller 121 (Step 220) which, in response, sends the command from the active queue 126 to the standby buffer 142 (Step 222). Thereupon, or if the command is found in the standby buffer 142 in Step 218, the command is moved from the standby buffer 142 into the standby queue 146 (Step 224).

A hardware or communications failure can occur at any time during the command processing and the active and standby unit controllers 121 and 141 periodically exchange brief handshaking signals across the inter-unit links. If one of the units 12 or 14 experiences a failure or the signal exchange is broken, the other unit controller of the other unit recognizes the fault and initiates an error recovery procedure. Step 226 is an example of one of many stages in the procedure at which a fault determination can be made; it is included at this particular stage by way of example only and not as a limitation. As long as the active unit A 12 experiences no failure (even if the standby unit B 14 fails) the active unit A 12 continues processing commands. Thus, after the command is queued in the standby unit B 14, the active command response generator 128 generates an appropriate response to the command (Step 228) and transmits it to the command source 16. It will be understood that the command from the command source 16 can include a request for a specified action to be initiated by the active unit A 12. The active unit A 12 will initiate such action as part of Step 228 and the appropriate response sent to the command source 16 can indicate that the action was initiated. Upon acceptance of the response, the active unit controller 121 directs the standby unit controller 141 to remove the command from the standby queue 146; it is not necessary for the standby unit B 14 to generate its own command response. The procedure then returns to the beginning at Step 204 to wait for another command. It will be appreciated that once a command is received in the active command buffer 122, another command can be transmitted by the command source. Thus, the foregoing is a continuous process with many commands moving through the "pipeline" at one time.

If the active unit A 12 fails (Step 226), the standby unit B 14 is activated (Step 234) and redesignated as the active unit (Step 236) while the failed, formerly active unit A 12 is taken off line for appropriate service or recovery. The command in the formerly standby buffer B 142 is validated and queued (Step 238) as previously described with respect to the active unit A 12 and a response generated (Step 240) and sent to the command source 16. Any other commands in the buffer or queue are also processed. A return is then made to the beginning to wait for further commands. When the failed unit A 12 is repaired and brought back on line, inter-unit handshaking resumes with the unit A 12 designated as the standby unit.

FIG. 3 is a block diagram of an automated data storage and retrieval library system 30 in which the present invention can be incorporated. The library 30 serves as a mass-storage device for one or more host computers 32 with which the library 30 is interconnected. The library 30 includes cells for storing data storage media, such as magnetic tape cartridges or optical disk cartridges. The number of cells depends upon the configuration of the library 30 but can range from just a few to many thousands. The library 30 also includes one or more data drives 34 for reading and/or writing data from or to the media. One or more drives 34 are interconnected with a drive controller 36 and each drive controller 36 is interconnected with the host 32.

The drive controllers 36 are also interconnected with a library manager 40 which monitors and manages the physical workings of the library 30. The library manager 40, in turn, is interconnected with an operator terminal 38 and an accessor controller 50. The accessor controller 50 monitors and manages a robotic transport mechanism 51 for moving media between storage cells and the drives 34, a gripper 52 mounted on the robot 51 for grasping the media, a vision system 54 for reading identification labels on the media, input and output stations 56 through which media can be passed to and from an operator, and interlock sensors 58 which indicate when a library access panel is opened.

In operation, the host 32 transmits a request to the drive controllers 36 for data access; the controllers 36 send the request to the library manager 40. A database within the library manager 40 indicates the identity and location of the media which is to be accessed and the library manager 40 issues a command to the access controller 50 to transport the media from its current location to one of the drives 34. Once the requested media is loaded in one of the drives 34, the host 32 is notified through the appropriate drive controller 36 and data can be transferred to or from the media.

FIG. 4 is a functional block diagram of the library manager 40 and will be referenced to illustrate the manner in which commands are processed by the library manager 40. Although command processing is discussed with specific reference to the library manager 40, it can also be employed in other applications. A first interface 402 interconnects the library manager 40 with the drive controllers 36; a second interface 404 interconnects the library manager 40 with the operator terminal 38 and the accessor controller 50. A command is received through the first interface 402 and into an in host message handler 406; it is then passed to a command validator 408 to ensure that it is a valid command and in the proper format. A response is generated by a response builder 410 indicating whether the command has been validated; the response is sent to the out host message handler 412 and out through the first interface 402 to the drive controllers 36.

If the command has been successfully validated, it is placed in a queue with previously received and validated commands in a command queue manager 414. The command is subsequently fetched from the queue for execution: an appropriate command to the accessor controller 50 or operator terminal 38 is generated by a command generator 416 and transmitted out, via an execution coordinator 418, through the second interface 404. When the command has been executed, the operator terminal 38 or accessor controller 50 sends a completion signal through the second interface 404 to a response handler 420 and on to the command generator 416. Thereafter, the command generator 416 signals the response builder 410 that the command has been executed. In turn, the response builder 410 sends a message, via the out host message handler 412, through the first interface 402 to the drive controllers 36 that the command has been executed.

The library manager 40 also has appropriate modules to manage routine errors (element 422), manual operations (element 424) and the media database (element 426). Moreover, the command validator 408, the command queue manager 414 and the response builder 410 are operationally interconnected with various other aspects of the library manager 40, such as an automated cartridge loader 428, if one is employed, an I/O manager 430, an inventory manager 432 and an auto-clean function 434 (to initiate and monitor drive cleaning at appropriate times). Operational states are also monitored by another module 436 and appropriate status messages sent to the drive controllers 36.

It will be appreciated that, if any subsystem of the library manager 40 fails, the entire library 30 may have to be shut down until repairs can be made. Having a library, or any other computer system, down for any period of time is costly and aggravating to users. Consequently, the present invention provides a fault tolerant system using redundant command managers. However, unlike conventional redundant systems in which commands are processed by both command processors simultaneously, the system of the present invention reduces inter-unit overhead and eliminates command processing by the standby unit until it is activated.

While the invention has been particularly shown and described with reference to preferred embodiments thereof, it will be understood by those skilled in the art that various changes in form and details may be made therein without departing from the spirit and scope of the invention.

What is claimed is:

1. A system for fault tolerant command processing, comprising:

a first receiver for receiving commands from a command source, comprising:
  a first buffer coupled to the command source;
  a first validation module coupled to receive commands from said first buffer; and
  a first queue coupled to receive validated commands from said first validation module;
a first transmitter, coupled with said first receiver, for transmitting a response to the command source;
a first inter-unit interface coupled with said first receiver and said first transmitter;
said first receiver, said first transmitter and said first inter-unit interface comprising a first command processing unit;
  a second receiver for receiving the command from the command source, comprising:
    a second buffer coupled to the command source;
    a second validation module coupled to receive commands from said second buffer; and
    a second queue coupled to receive validated commands from said second validation module;
a second transmitter, coupled with said second receiver, for transmitting a response to the command source;
a second inter-unit interface coupled with said second receiver, said second transmitter and said first inter-unit interface;
said second receiver, said second transmitter and said second inter-unit interface comprising a second command processing unit; and
a controller for designating that said first command processing unit be an active unit and respond to the command and that said second command processing unit be a standby unit and respond to the command only if a failure occurs in said first command processing unit, wherein said first receiver and said first transmitter are operationally linked with said second receiver when said first command processing unit is the active unit.

2. The system of claim 1, further comprising means for directing that the command be transmitted from said first receiver to said second receiver if the command is not received by the second receiver from the command source.

3. The system of claim 1, wherein said controller further comprises:

means for detecting when said first command processing unit is restored; and means for redesignating said first command processing unit as the standby unit;

wherein said second receiver and said second transmitter are operationally linked with said first receiver.

4. The system of claim 1, wherein:

when said first command processing unit is designated as the active unit and said second command processing unit is designated as the standby unit, said first and second inter-unit interfaces comprise:
a first operational link between said first queue and said second queue;
a second operational link between said first queue and said second buffer; and
a third operational link between said first response generator and said second queue; and when said second command processing unit is designated as the active unit and said first command processing unit is designated as the standby unit, said first and second inter-unit interfaces comprise:
a fourth operational link between said second queue and said first buffer; and
a fifth operational link between said second response generator and said first queue.

5. A method of fault tolerant command processing, comprising the steps of:

a) designating a first command processing unit as an active unit and designating a second command processing unit as a standby unit;
b) receiving a command in a command buffer of the first command processing unit, the command being transmitted by a command source;
n) attempting to receive the command in a command buffer of the second command processing unit;
c) validating the command in a command received in the command buffer of said first command processing unit validating module of the first command processing unit;
d) queuing the validated command in a command queue of the first command processing unit;
e) transmitting a queue message from the first command processing unit to the second command processing unit;
f) if the command is found in the command buffer of the second command processing unit, queuing the command in a command queue of the second command processing unit;
g) directing that the first command processing unit respond to the command received in the command buffer of said first command processing unit;
h) transmitting a de-queue message from the first command processing unit to the second command processing unit; and
i) de-queuing the command from the command queue of the second command processing unit.

6. The method of claim 5, wherein said step of de-queuing the command from the command queue of the second processing unit comprises the step of de-queuing the command without the second command processing unit responding to the command.

7. The method of claim 5, further comprising the step of associating a command identifier with the command received from the command source.

8. The method of claim 7, wherein said step of transmitting a queue message comprises the step of transmitting a message which include the command identifier and a queue directive.

9. The method of claim 7, wherein said step of transmitting a de-queue message comprises the step of transmitting a message which include the command identifier and a de-queue directive.

10. The method of claim 5, further comprising the step of periodically exchanging a handshaking signal between the active command processing unit and the standby command processing unit wherein a failure of one unit to receive a handshaking signal is an indication of a fault in the other unit.

11. The method of claim 5, further comprising the step of, if the first command processing unit has failed:

j) taking the first command processing unit off-line;
k) re-designating the second command processing unit as the active unit; and
l) directing that the second command processing unit process commands in the command buffer and command queue of the second command processing unit.

12. The method of claim 11, further comprising the step of:

m) re-designating the first command processing unit as the standby unit after the failure has been corrected.

13. The method of claim 5, further comprising the steps of:

o) after the step e), determining whether the command is in the command buffer of the second command processing unit;
p) if the command is not in the command buffer of the second command processing unit, sending an error message from the second command processing unit to the first command processing unit; and
q) transmitting the command from the command queue of the first command processing unit to the command queue of the second command processing unit.

14. The method of claim 13, wherein:

said step of transmitting a queue message comprises the step of transmitting a message which include a command identifier and a queue directive; and
said step of transmitting the command from the first command processing unit comprises the step of transmitting the command and an associated identifier.

15. A fault tolerant, automated data storage and retrieval library, comprising:

a data drive for writing data to or reading data from a selected one of a plurality of removable storage media;
a drive controller interconnected between said data drive and a host processor;
a media accessor for transporting the selected media between a storage cell and said data drive;
first and second library managers coupled with said drive controller and said media accessor;
each of said first and second library managers having:
a command buffer coupled to receive commands from said drive controller;
a command validation module coupled to receive commands from said command buffer;
a command queue coupled to receive validated commands from said command validation module;
a command response generator coupled to receive validated commands from said command queue and to transmit command responses to said drive controller; and
an interface, comprising:
a first operational link between said command queue of said first library manager and said command queue of said second library manager;
a second operational link between said command queue of said first library manager and said command buffer of said second library manager; and a third operational link between said command response generator of said first library manager and said command queue of said second library manager.

16. The library of claim 15, further comprising means for initially designating that said first library manager be an active unit and that said second library manager be a standby unit.

17. The library of claim 16, wherein said first library manager further comprises:

means for directing that said command queue of said first library manager transfer a command to said command queue of said second library manager after the command has been validated and transferred into said command queue of said first library manager if the command is not received in said command buffer of said second library manager; and means for directing that the command be dequeued from said command queue of said second library manager after said command response builder of said first library manager has completed a response to the command.

18. The library of claim 16, further comprising means for re-designating said second library manager as the standby unit when said first library manager incurs a failure and for re-designating said first library manager as the standby unit when the failure is corrected.

19. The library of claim 18, wherein said interface further comprises:

a fourth operational link between command queue of said second library manager and said command buffer of said first library manager; and a fifth operational link between said command response generator of said second library manager and said command queue of said first library manager.

20. The library of claim 15, wherein said first library manager further comprises:

means for directing that said command buffer of said second library manager transfer a command to said command queue of said second library manager after the command has been validated and transferred into said command queue of said first library manager; and means for directing that the command be dequeued from said command queue of said second library manager after said command response builder of said first library manager has completed a response to the command.

* * * * *